United States Patent [19]

Dost et al.

[11] Patent Number: 4,875,112
[45] Date of Patent: Oct. 17, 1989

[54] COMPOUND PULSE DIMMING CIRCUITRY FOR CONDITIONING READBACK SIGNALS

[75] Inventors: Martin H. Dost; Emil Hopner; Constantin M. Melas, all of Los Gatos; Lionel D. Provazek, Campbell, all of Calif.

[73] Assignee: International Business Machines Corporation, Armonk, N.Y.

[21] Appl. No.: 815,110

[22] Filed: Dec. 31, 1985

[51] Int. Cl.$^4$ ............................................. G11B 5/035
[52] U.S. Cl. ....................................... 360/65; 360/45
[58] Field of Search ................. 360/45, 65; 375/12, 375/14, 60; 333/18, 28 R, 165, 166, 167; 364/724

[56] References Cited

U.S. PATENT DOCUMENTS

| | | | |
|---|---|---|---|
| 3,775,759 | 11/1973 | Armitage, Jr. et al. | 340/174.1 H |
| 4,071,782 | 1/1978 | Vidovic | 333/28 R |
| 4,167,761 | 9/1979 | Best | 375/60 |
| 4,202,017 | 5/1980 | Geffon et al. | 360/45 |
| 4,244,008 | 1/1981 | Holt | 360/45 |
| 4,264,935 | 4/1981 | Lee | 360/45 |
| 4,266,204 | 5/1981 | Jacoby | 333/28 R |
| 4,323,932 | 4/1982 | Eibner | 360/45 |
| 4,327,383 | 4/1982 | Holt | 360/45 |
| 4,344,093 | 8/1982 | Huber | 360/45 |
| 4,506,236 | 3/1985 | Cloke | 333/167 |
| 4,521,818 | 6/1985 | Guisinger | 360/65 |
| 4,644,424 | 2/1987 | Nishiyama et al. | 360/65 |

OTHER PUBLICATIONS

Jorgensen, Finn, "*The Complete Handbook of Magnetic Recording*", 3-14-1984, p. 276.
Schneider, Richard C., "An Improved Pulse-Slimming Method for Magnetic Recording", IEEE Transactions on Magnetics, vol. Mag-11, #5, Sep. 1975.

Primary Examiner—Vincent P. Canney
Assistant Examiner—Surinder Sachar
Attorney, Agent, or Firm—F. David LaRiviere; Henry E. Otto, Jr.

[57] ABSTRACT

A pulse signal conditioner filters and equalizes signal pulses representing digital data whether or not obtained from a magnetic recording device. Modified low pass filters filter the pulse signals and also derive and feed forward the second time derivative of the filtered pulse signals. The filtered pulse and the second time derivative thereof are combined to slim the pulse. Further slimming is provided by delay line equalizers having three paths. A first path for attenuating the pulse signals, a second path for delaying the pulse signals for a first delay, and a third path for delaying the pulse signals for a second delay and attenuation. Pulse signals from the three paths are combined to further slim the pulse.

23 Claims, 8 Drawing Sheets

COMPOUND PULSE DIMMING CIRCUITRY FOR CONDITIONING READBACK SIGNALS

BACKGROUND OF THE INVENTION

This invention relates to the field of processing readback signals representing data recorded in magnetic recording devices and, in particular, to binary data signal conditioning and detection. Improved performance and capability of magnetic recording devices, in particular, increased capacity by increasing density of recorded flux transitions representing data, have been achieved largely through advances in head and media technology. As further advances in head technology, head-to-media spacing, media surface smoothness and the like have become more difficult to achieve, signal processing techniques now provide opportunities for further improvement.

As density of recorded data is increased, pulses in the readback signal derived from the recorded transitions become more crowded causing intersymbol interference between adjacent pulses. Intersymbol interference caused by pulse crowding causes peak shift of the pulses and reduces pulse amplitude, both of which degrade data retrieval.

Higher density of recorded data produces readback signals of correspondingly higher frequency. Thus, the frequency response of read channel electronic circuitry must be adequate to avoid degradation of the signal and difficulties in data detection.

Signal processing of readback signals has in the past included pulse shaping, filtering and amplifying in various combinations to mitigate intersymbol interference and related effects of higher density data recording. For example, U.S. Pat. No. 3,775,759 discloses tapped delay line equalization in which a readback signal is filtered and incidentally, slimmed. When readback pulses are slimmed, their rising and falling edges are moved closer together, and are less apt to interfere with adjacent pulses.

U.S. Pat. No. 4,264,935 discloses slimming of pulses using a plurality of summed delays as well as a differentiator to produce a slimmer pulse representing data. The use of delay for slimming is also described in U.S. Pat. No. 3,828,362 and in "The Complete Handbook of Magnetic Recording" by Finn Jorgensen at page 276.

In U.S. Pat. No. 4,202,017, a pulse equalization technique is described in which negative-polarity read pulses are symmetrically positioned around, and algebraically added to, positive-polarity read pulses to produce a single composite read pulse which is substantially narrower than the initial positive polarity read pulse. Pulse slimming, achieved by using the first and second derivatives of the smoothed readback pulse is described in "An Improved Pulse-Slimming Method for Magnetic Recording" by Richard C. Schneider, published in IEEE Transactions on Magnetics, Vol. Mag-11, No. 5, September 1975.

Filtering of readback pulses permits higher density data recording. See, for example, U.S. Pat. No. 4,244,008 which teaches filtering as part of a readback compensation circuit. Finally, U.S. Pat. No. 4,327,383 describes a combination of several signal processing functions in the readback path including an amplifier, an equalizing filter, a low pass filter and a decoder. Readback signal pulse slimming techniques inherently cause decrease of signal-to-noise (S/N) ratio. Of course, S/N is also affected by other system components, including encoding and detection devices.

SUMMARY OF THE INVENTION

The present invention comprises a combination of two complementary pulse slimming techniques in conjunction with a convenient method for deriving the second derivative of the pulse to be slimmed which permits more pulse crowding in any application involving recovery of binary data, whether or not such data is also stored in a magnetic recording device. In disk memory applications, the present invention also accommodates variations arising from the difference between data recorded at the inner and outer diameters of the disk, and may be used with both inductive as well as magnetoresistive heads.

In the present invention, a pulse signal conditioner includes one or more modified low pass (MLP) filters, each having negative feed-forward of the second derivative of their respective output signals, and one or more delay line equalizers, each having three signal paths to provide shaping of the input pulse, all coupled serially in any order to provide optimum data pulse slimming and shaping. Higher densities of such conditioned pulses may then be detected by any suitable detector, including those utilizing maximum likelihood detection techniques.

DESCRIPTION OF THE PREFERRED EMBODIMENT

Figure 1:
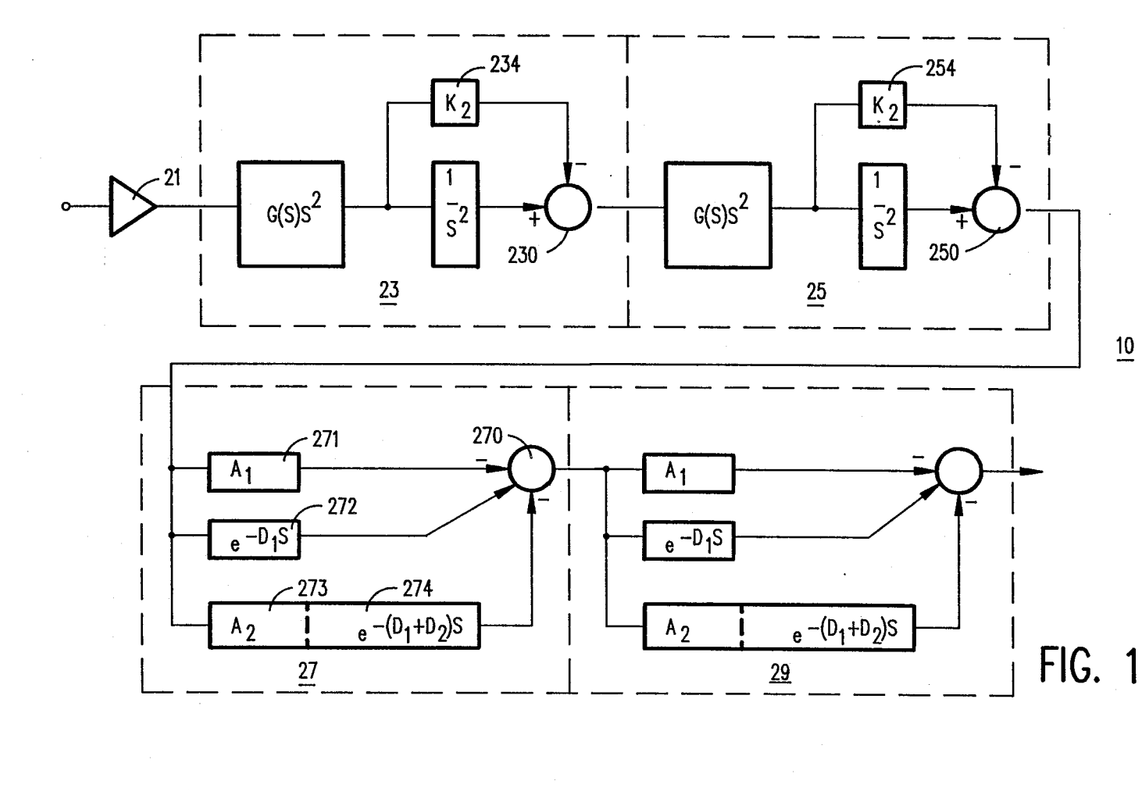
FIG. 1 is a block diagram of a pulse signal conditioner according to the principles of the present invention.

In FIG. 1, signal conditioner 10 comprises preamplifier 21, MLP filters 23 and 25, and delay line equalizers 27 and 29. MLP filters 23 and 25 are essentially identical, and, in at least one embodiment, are modifications of the well-known Butterworth filter, having a transfer function of the form $$G(S) = \frac{1}{S^n + a_{n-1}S^{n-1} \cdots a_1 S + 1};$$

In the present invention, however, the filters each inherently provide the second derivative of their respective output signals via network 234 for filter 23, and via network 254 for filter 25, for use in modifying such output signals. Thus, as MLP filter 23 filters data pulse signals received from preamplifier 21, it also produces the second derivative of its output signal, which is combined with that output signal by summer 230. Similarly, summer 250 combines the output from summer 230, produced from the output of MLP filter 23, with the second derivative of its output.

Figure 2A:
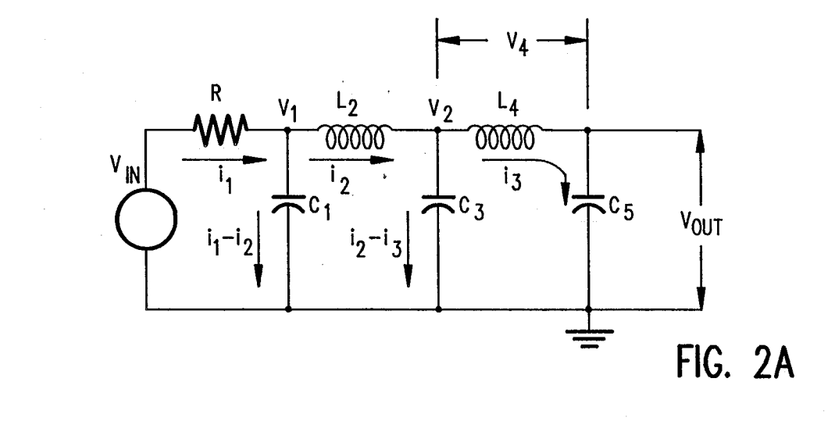
FIG. 2A is a schematic diagram of a prior art low pass filter.

Referring now to FIG. 2A, a fifth order Butterworth filter comprises series-connected resistor, R, and inductors, $L_2$ and $L_4$, coupled to grounded capacitors, $C_1$, $C_3$ and $C_5$. The second derivative of $V_{out}$ is the voltage, $V_4$, across $L_4$, or $$V_4 = V_2 - V_{out} \tag{1}$$

Figure 2B:
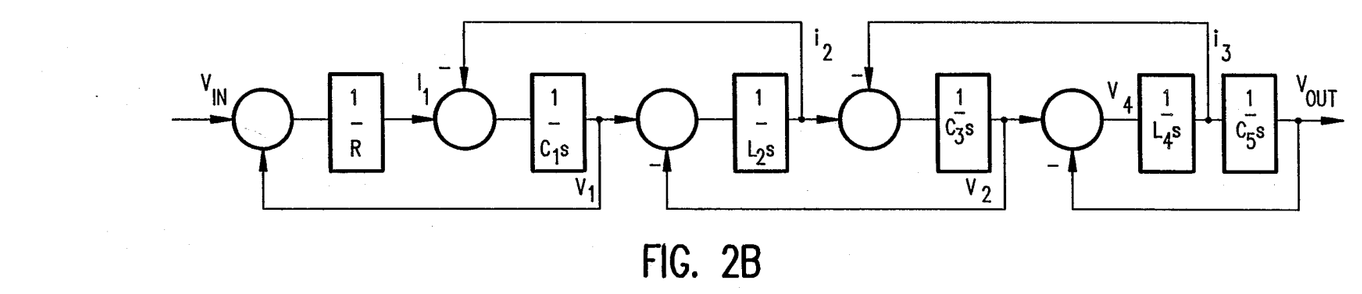
FIG. 2B is a block diagram of the filter of FIG. 2A.

The voltage across $L_4$ is clearly the second derivative of $V_{out}$ because it is the inverse of the two integrations performed by capacitor $C_5$ and inductor $L_4$ as shown in FIG. 2B.

For desired pulse slimming, $V_4$ must be subtracted from $V_{out}$. Thus, according to the present invention, a signal corresponding to $V_4$ is applied via network 234 to summer 230, which subtracts that signal from the output signal of MLP 23. Similarly, the signal corresponding to $V_4$ in MLP 25 is applied via network 254 to summer 250, which subtracts that signal from the output signal of MLP 25.

The transfer function, $G_2$, for each MLP filter is given by:

$$G_2 = \frac{1 - k_2 S^2}{S^n + a_{n-1}S^{n-1} + \ldots + a_1 S + 1} \tag{2}$$

where $S = s/\omega_c$

In equation (2), n is the order of the filter, $a_i$ are polynomial coefficients, s is the Laplace operator, $\omega_c$ is the corner frequency, and $k_2$ is the coefficient for the second derivative component.

Figure 3A:
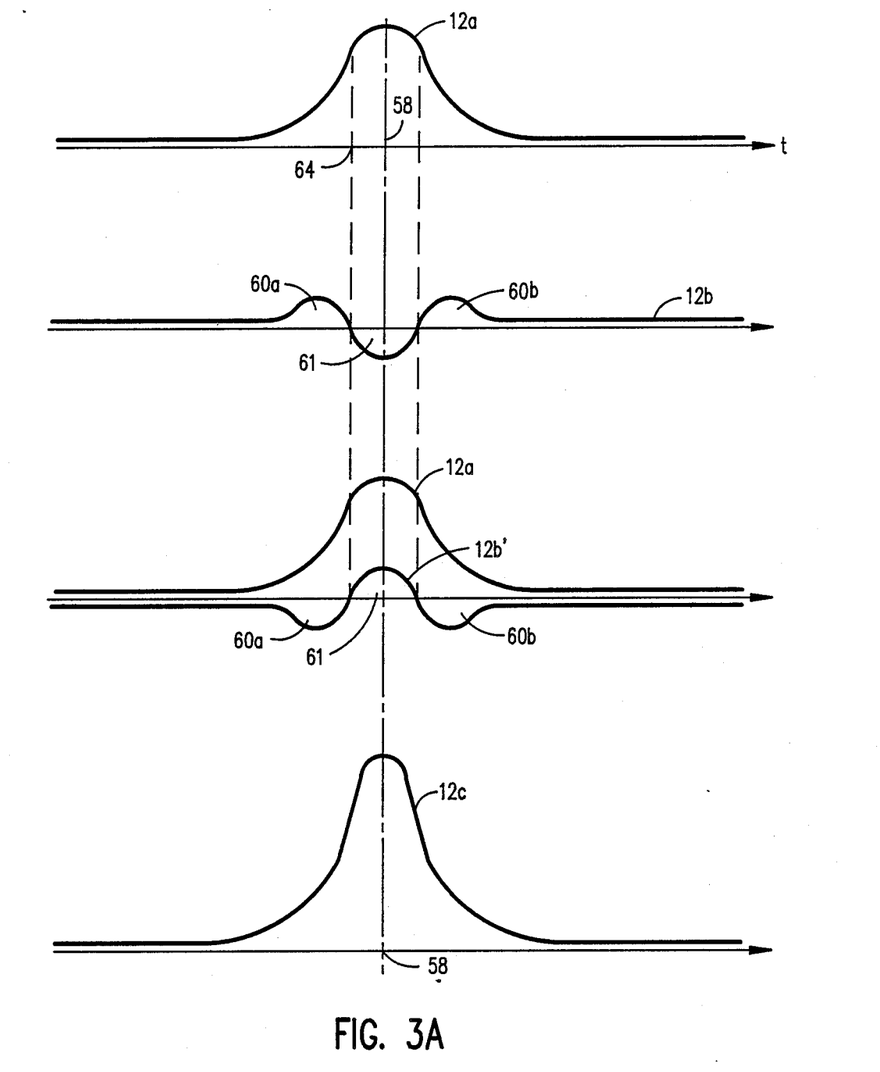
FIG. 3A is a graphical representation of waveforms indicating the idealized pulse signal slimming operation of an MLP filter of FIG. 1.

Referring now to FIG. 3A, desired data pulse 12c results from subtraction of pulse 12b, the second derivative of data pulse 12a, from pulse 12a by summer 230 of MLP filter 23. In like manner, summer 250 subtracts the second derivative of the output pulse of MLP filter 25. Of course, subtraction of one waveform from another can be obtained by addition of the negative of one to the other. Such an operation is also shown in FIG. 3A by addition of pulse 12b', the inverse of pulse 12b, to pulse 12a. Without the effect of subtracting the second derivative from the output, data pulse 12c would be equal to data pulse 12 a, i.e. similar to the output from preamplifier 21, merely somewhat shifted in time, attenuated and smoothed by operation of an unmodified low pass filter.

Referring again to FIG. 1, delay line equalizers 27 and 29 are also essentially identical and each comprise two delay lines and two attenuators disposed in three signal paths. In equalizer 27, the data signal received from MLP filter 25 is transmitted through attenuator 271 to summer 270, through delay line 272 to summer 270, and through attenuator 273 and delay line 274 to summer 270. Summer 270 subtracts the signals received from attenuators 271 and 273 from the delayed signal received from delay line 272. The delays and attenuations are selected so that attenuated pulses suitably shape rising and falling edges of the pulse being conditioned as shown in FIG. 3B.

Figure 3B:
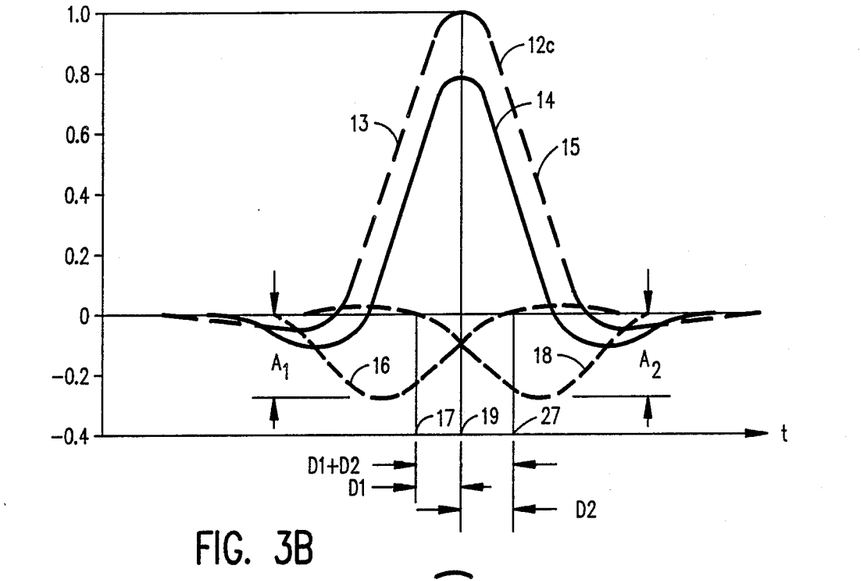
FIG. 3B is a graphical representation of waveforms indicating the idealized pulse signal slimming operation of a delay line equalizer of FIG. 1.

With continuing reference to FIG. 3B, data signal pulse 12c is slimmed as result of the subtracting (algebraically adding) attenuated signals from the rise and fall time thereof. Pulse 12c, delayed by delay line 272, is derived from the output of filter 25. Thus, slimmed data pulse 14 results from the subtraction of attenuated pulse 16, produced by attenuator 271 during rise time 13 of pulse 12c, and the subtraction of pulse 18, produced by attenuator 273 and delay line 274, during fall time 15 of pulse 12c. The loss in amplitude of pulse 14, owing to the coincidence of the peak of pulse 12c with the falling and rising times, respectively, of pulses 16 and 18 as shown, can be minimized by appropriate selection of delays $D_1$ and $D_2$ and attenuations $A_1$ and $A_2$.

Figure 4:
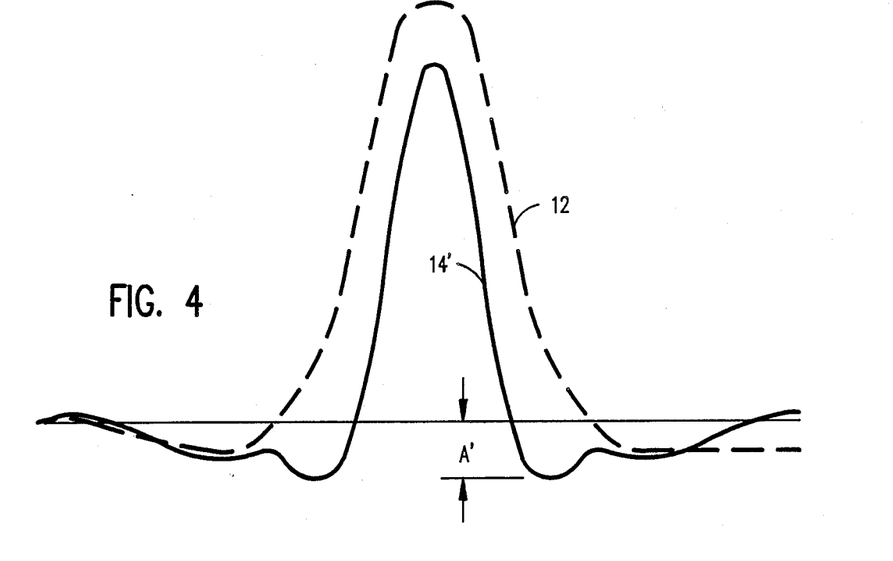
FIG. 4 is a graphical representation of the waveform indicating the idealized overall effect on pulse signals by the pulse signal conditioner of FIG. 1.
Figure 5A:
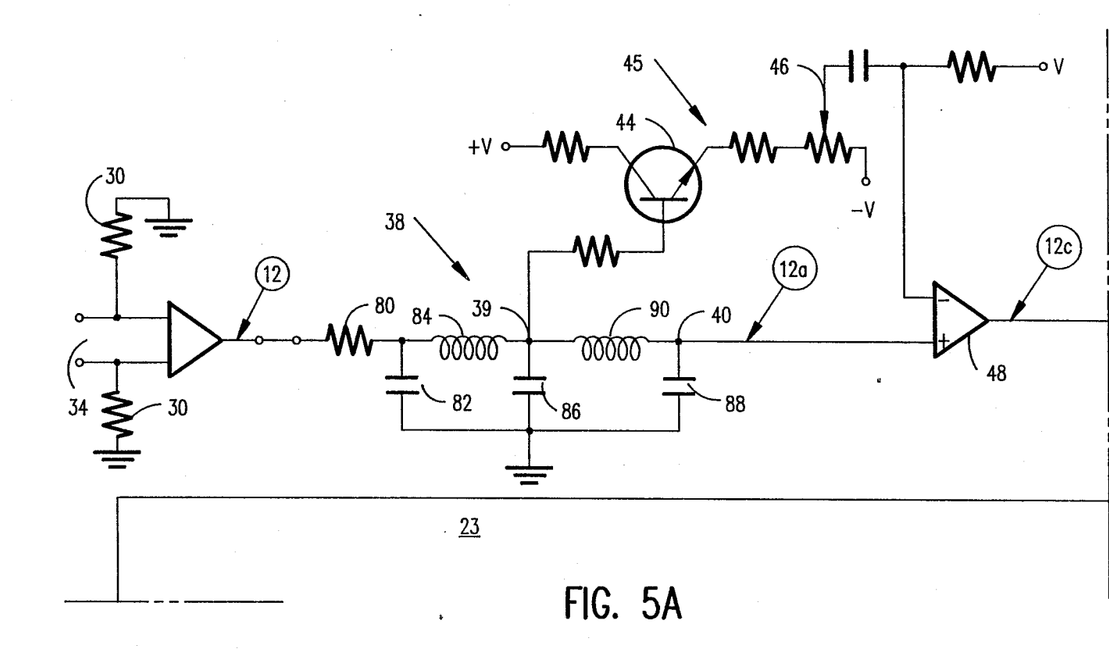
FIG. 5 consisting of 5A through 5D is a schematic diagram of the pulse signal conditioner of FIG. 1.
Figure 5B:
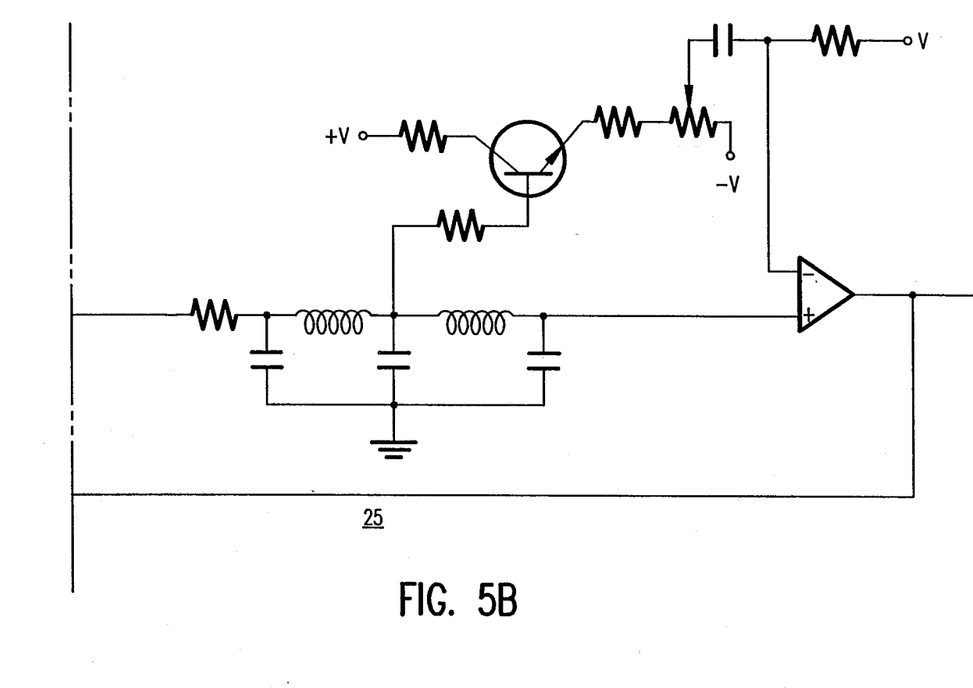
Figure 5C:
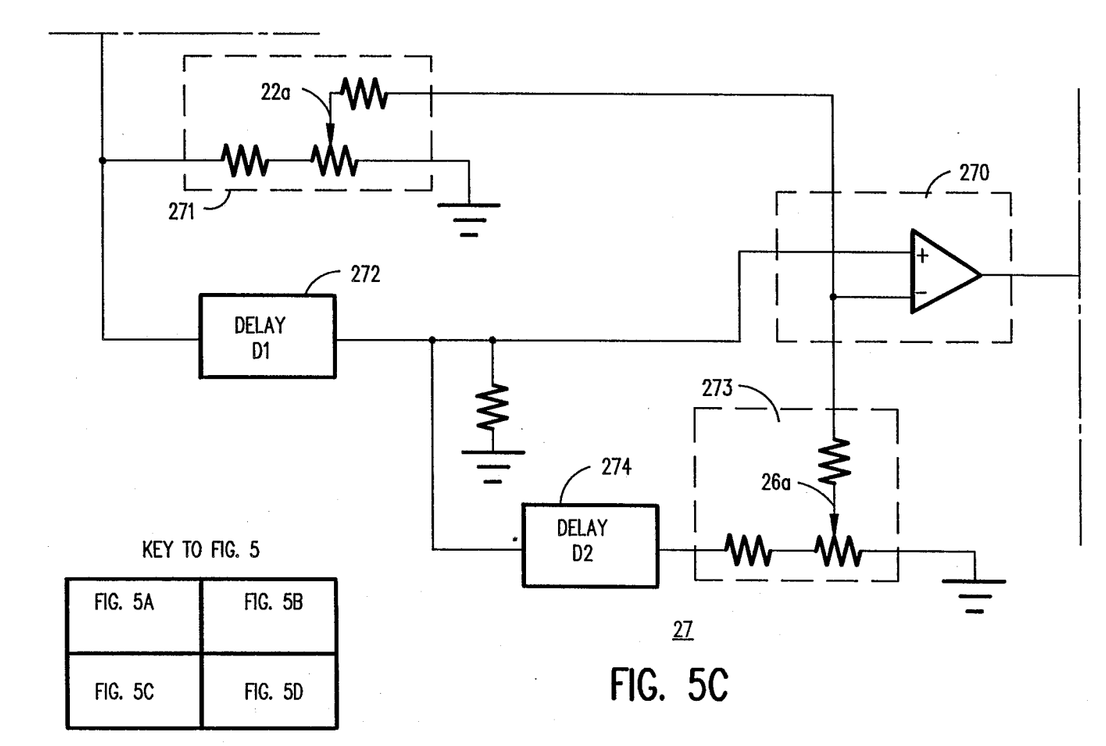
Figure 5D:
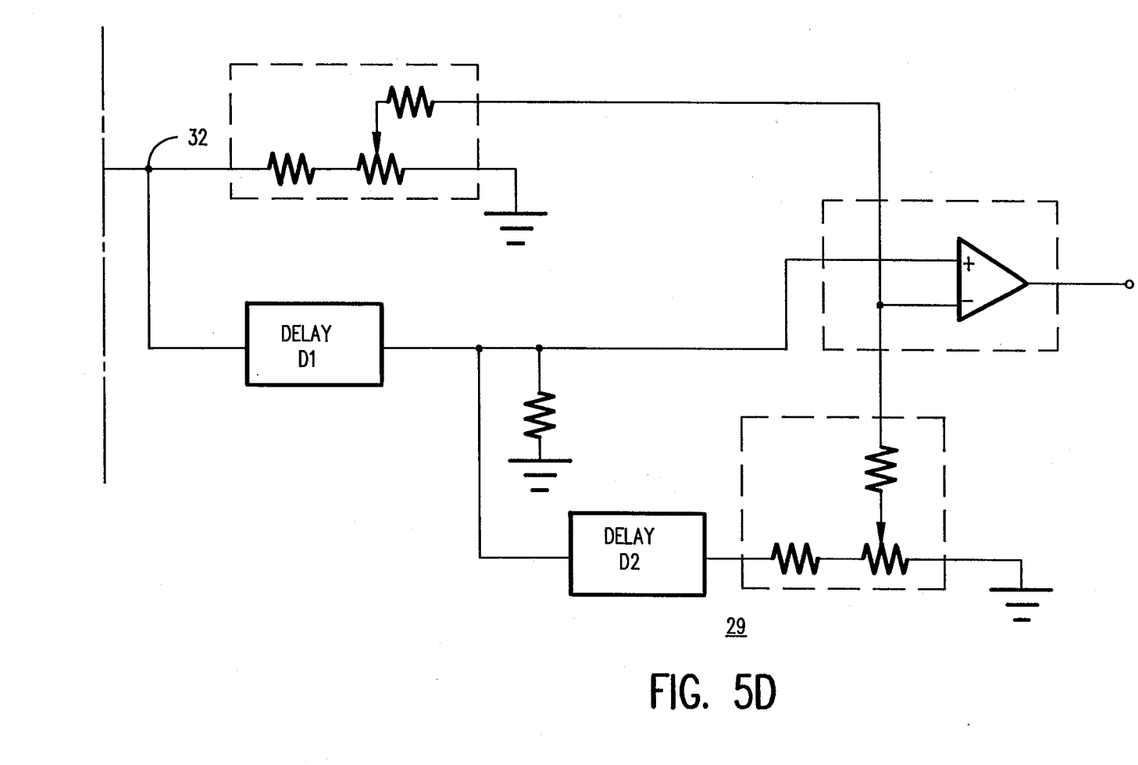

An isolated pulse 14', slimmed by signal conditioner 10, is shown together with a raw data pulse 12 from buffer amplifier 21, in FIG. 4. It should be understood that the waveforms of FIGS. 3A, 3B and 4 are idealized representations of the signals produced by the system of the present invention, and that actual waveforms produced by signal conditioner 10 may vary from those illustrated.

With continuing reference to FIG. 4, amplitude overshoot A' of pulse 14' must be controlled to optimize operation in the bandwidth constraints of the system in which the present invention is used. Here, overshoot is defined as signal amplitudes of opposite polarity on either side of the main data signal pulse. For example, in disk memory devices, a pulse slimmed without regard for overshoot may be detectable at the inner diameter (ID) of recorded data but not at the outer diameter (OD). Too much overshoot will typically degrade signal detection capability at the OD where the bandwidth of the device is greater than at the ID. Experimental results indicate that overshoot of about 10% allows optimum detection of pulse signals, slimmed according to the present invention, at both ID and OD.

FIG. 5 shows one of many possible circuit configurations for signal conditioner 10 of the present invention. Input amplifier 21 has an input port 34 for receiving readback signals from a binary data storage device. Resistors 30, taken with the input impedance of amplifier 36, provide termination impedance for the signal applied to input port 34. The readback pulses received at port 34 must not be degraded by excessive frequency roll-off in the recording channel prior to being applied to pulse conditioner 10 or they will not have sufficient high frequency content to permit conditioning. Thus, a channel with gradual roll off is required.

Amplifier 21 transmits pulse 12 to MLP filter 23 which is shown as a conventional five-pole Butterworth (BW) filter 38. BW filter 38 includes capacitor elements 82, 86, 88 connected as shunts to ground, resistor 80 and inductor elements 84, 90 connected in series with the path of pulse 12. Filter elements 82–90 within BW 38 thus perform successive integrations of input pulse 12, producing a filtered pulse 12a at the output of BW 38 which is then transmitted to the positive input terminal of differential amplifier 48.

The circled reference numbers in FIG. 5 correspond to the pulse waveforms in FIG. 3A. Because elements 82–90 perform successive integrations within BW filter 38, two pure derivatives of the output pulse 12a are produced. As indicated earlier, waveform 12b of FIG. 3A depicts the second derivative of pulse 12a.

Second derivative pulse 12b appears as the voltage across inductor 90 between circuit nodes 39 and 40. The voltage at node 40 is applied to the positive input terminal of differential amplifier 48. Since the voltage at node 39 is applied to the negative input terminal of amplifier 48 via feed-forward circuit 45, the voltage across inductor 90 is subtracted from the output of filter 38, thereby subtracting pulse 12b from pulse 12a.

The voltage at node 39 is applied to feed forward circuit 45. Circuit 45 includes transistor 44 and potentiometer 46. The signal at node 39 is applied to the base of transistor 44, and the magnitude of waveform 12b, which is applied to the negative terminal of differential amplifier 48, may be set by adjusting potentiometer 46. A greater gain from circuit 45 results in an increase in the magnitude of pulse 12c. However, it also degrades the signal-to-noise ratio of MLP filter 23. Therefore, a compromise must be established between the magnitude of pulse 12c and desirable signal-to-noise ratio.

The operation of the circuit of filter 25 is identical to that just described for filter 23.

It should be noted that a fifth-order BW filter is not required to derive the second derivative of the output signal of such a filter. Any low pass filter having an output stage comprising a series inductor and parallel capacitor, may be used to produce such second derivative. Of course, circuitry, such as that described in this specification, must also be provided to subtract the second derivative of the output signal from the output signal.

It should also be noted that the first derivative of the filtered output of the filter is also available from the low pass filter modified according to the present invention. When used in conjunction with the second derivative for pulse slimming, it can make the equalized signal more symmetrical. Such first derivative, if used, is represented by a current 13 through an inductor 90, and means for sensing such current, such as a series resistor, must be provided. In addition, circuitry for feeding forward the signal representing the first derivative to condition the output signal must be provided.

Equalizer 27 receives pulse 12c from MLP filter 25. The transfer function of equalizer 27 may be expressed as:

$$G_3 = -A_1 + e^{-D_1 s} - A_2 e^{-(D_1+D_2)s} \quad (3)$$

where s is the Laplace operator. Pulse 12c is applied to attenuator 271 in which potentiometer 22a may be used to adjust the magnitude of the attenuation factor $A_1$. Attenuation factor $A_1$ determines the magnitude of pulse 16 shown in FIG. 3B. Pulse 16 is applied to the negative terminal of differential amplifier 270. Therefore equation (3) shows $A_1$ as having negative polarity.

Pulse 12c is also applied to delay 272 which can be a portion of a conventional tapped delay line. Delayed pulse 12c, which appears at the output of delay 272, is applied to the positive terminal of differential amplifier 270 with a delay $D_1$. The transfer function of delay 272 is $+e^{-D_1 s}$ as shown in equation (3).

Pulse 12c is also applied through delay 272 to delay 274. Delay 274 provides a delay $D_2$ to pulse 12c received from delay 272. Pulse 12c has already received a delay $D_1$ from delay 272. Thus, the pulse at the output of delay 274 has a total delay of $D_1+D_2$ which is then applied to attenuator 273. Attenuator 273 includes a potentiometer 26a which may be used to adjust the attenuation factor $A_2$. This adjustment determines the amplitude of attenuated pulse 18.

Potentiometers 22a and 26a can be separately adjusted for symmetrical slimming of pulse 12c. If delays $D_1$ and $D_2$ are chosen to be substantially identical, the time relationship between the peak of pulse 16 and the peak of pulse 12c is substantially identical to the time relationship between the peak of pulse 12c and the peak of pulse 18. Therefore, the total delay provided to delayed and attenuated pulse 18 is equal to approximately twice the delay provided to delayed pulse 12c.

As stated earlier in this specification, the first derivative of the filtered output of the filter is also available for output pulse signal conditioning. However, with the symmetry adjustments provided by potentiometers 22a and 26a, taken with selection of delays $D_1$ and $D_2$, the first derivative is not necessary to optimize pulse shape.

Attenuated pulses 16 and 18 are subtracted from delayed unattenuated pulse 12c by differential amplifier 270. The peak magnitude of pulse 16 occurs at time 17, at which time pulse 12c is rising. Attenuated pulse 16 primarily affects rising edge 13 of pulse 12c. The peak magnitude of attenuated pulse 18 occurs at time 27 when pulse 12c is falling. Thus, pulse 18 primarily affects falling edge 15 of pulse 12c. Attenuated pulses 16, 18 have non-zero magnitudes at time 19 when pulse 12c reaches its peak. Output pulse 14, which appears at output terminal 32, is therefore somewhat reduced in magnitude from pulse 12c.

The operation of the circuit of equalizer 29 is identical to that described for equalizer 27. It should be noted that equalizers 27 and 29 have inherently linear phase or constant group delay.

The filters and equalizers of the present invention are used in pairs for near-optimum noise suppression while maintaining sharp frequency rolloff. Each equalizer, while particularly effective for pulse slimming, inherently reduces signal amplitude. Conversely, the MLP filters increase signal amplitude while slimming pulses. When used in tandem, they complement each other and total loss of signal is minimal. Thus, a readback data signal conditioned by the signal conditioner of the present invention permits data pulses to be more densely packed and have less intersymbol interference when detected.

The transfer function, $G_1$, for an MLP filter in tandem with an equalizer according to the present invention is given by $$G_1 = G_2 G_3 \quad (4)$$

where $G_2$ and $G_3$ are given by equations (1) and (3), respectively. If two each MLP filters and equalizers are used, the transfer function becomes $$G_T = G_1^2 = [G_2 G_3]^2. \quad (5)$$

What is claimed is:

1. Apparatus for conditioning pulse signals representing digital data, said apparatus comprising:
   delay line equalizer means for equalizing the pulse signals; and
   filter equalizer means coupled to said delay line equalizer means for complementally equalizing said pulse signals, and including a first path for filtering the pulse signals and to provide filtered pulses at an output, a second path for feeding forward a signal representing the time derivative of said filtered pulse signals at an output, and combining means for combining the signals at the output of the first and second paths.

2. Apparatus as in claim 1 wherein the first path includes a filter selected from the set consisting of low pass filters.

3. Apparatus as in claim 1 wherein said delay line equalizer means includes:

first attenuator means for attenuating the pulse signals;

first delay means for delaying pulse signals;

second delay and attenuator means for delaying and attenuating pulse signals; and summing means for combining the pulse signals from the first attenuator means, the first delay means, and the second delay and attenuator means.

4. Apparatus as in claim 3 wherein the summing means includes means for subtracting the pulse signals from the first attenuator and the second delay and attenuator means from the pulse signals from the first delay means.

5. Apparatus as in claim 3 wherein the second delay means provides a delay of pulse signals which is equal to approximately twice the delay of pulse signals provided by the first delay means.

6. Apparatus as in claim 2 wherein each filter comprises at least a two-pole filter.

7. Apparatus as in claim 1 wherein the combining means includes means for adjusting the magnitude of the signals representing the time derivative combined with said filtered pulses.

8. Apparatus as in claim 1 wherein the time derivative is the second time derivative.

9. Apparatus as in claim 1 wherein the transfer function of the equalizer means is given by $$G_3 = -A_1 + e^{-D_1 s} - A_2 e^{-(D_1+D_2)s}$$

where s is the Laplace operator, $D_1$ and $D_2$ are delay factors and $A_1$ and $A_2$ are attenuation factors.

10. Apparatus as in claim 9 wherein the transfer function of the filter means is given by $$G_2 = \frac{1 - k_2 S^2}{S^n + a_{n-1}S^{n-1} + \ldots + a_1 S + 1}$$

where $S = s/\omega_c$, s is the Laplace operation, $\omega_c$ is the corner frequency, $a_i$ are polynomial coefficients and $k_2$ is the coefficient for the second derivative component.

11. A method for conditioning pulse signals representing digital data, said method comprising the steps of:

equalizing the pulse signals;

filtering the pulse signals for providing filtered pulse signals;

deriving a signal representing the time derivative of said filtered pulse signals; and combining the filtered pulse signals and the signal representing the time derivative of said filtered pulse signals, said step of equalizing the pulse signals including the steps of:

attenuating said pulse signals;

delaying said pulse signals for a first delay;

delaying said pulse signals for a second delay and attenuating them; and combining the first attenuated pulse signals, the first delayed pulse signals and the second delayed and attenuated pulse signals.

12. The method as in claim 11 wherein the step of combining includes the steps of subtracting the first attenuated pulse signals and the second delayed and further attenuated pulse signals from the first delayed pulse signals.

13. The method as in claim 11 wherein the magnitude of the second delay is approximately equal to twice the magnitude of the first delay.

14. The method as in claim 11 wherein the step of deriving a signal representing the time derivative includes the step of adjusting the magnitude of the time derivative.

15. The method as in claim 11 wherein the time derivative of said filtered pulse signals is the second time derivative of said filtered pulse signals.

16. Apparatus for conditioning pulse signals representing digital data, said apparatus comprising:

at least two delay line equalizers for equalizing the pulse signals; and at least two pass filters coupled to said delay line equalizers for complementally equalizing said pulse signals, including means for deriving signals representing the second derivative of, and means for subtracting said second derivative signals from, the filtered pulse signals produced by said low pass filters.

17. Apparatus as in claim 16 wherein each of the low pass filters is a low pass filter having at least two poles.

18. Apparatus as in claim 16 wherein each of the low pass filters has multiple stages and the means for deriving the signal representing the second derivative of the filtered pulse signals is the last stage of the low pass filter.

19. Apparatus as in claim 18 wherein the last stage of the low pass filter includes an inductive impedance in series with the pulse signal path and a capacitive impedance to ground.

20. Apparatus as in claim 16 wherein the means for subtracting the signal representing the second derivative of the filtered pulse signals includes a feed-forward circuit for feeding forward the second derivative signals and an amplifier for receiving and subtracting the second derivative signals from said filtered pulse.

21. Apparatus as in claim 19 wherein the signal representing the second derivative of the filter pulse signals is derived from the voltage across said inductive impedance of said last stage of said low pass filter.

22. Apparatus for conditioning pulse signals representing digital data according to a transfer function of $G_1 = G_2 G_3$, said apparatus comprising:

delay line equalizer means for equalizing the pulse signals and having a transfer function of $G_3$;

filter equalizer means coupled to said delay equalizer means complementally equalizing said pulse signals according to a transfer function of $G_2$ and including a first path for filtering the pulse signals and to provide filtered pulses at an output, a second path for feeding forward a signal representing the time derivative of said filtered pulse signals at an output, and combining means for combining the signals at the output of the first and second paths, where $$G_2 = \frac{1 - k_2 S^2}{S^n + a_{n-1}S^{n-1} + \ldots + a_1 S + 1}, \text{ and}$$

$$G_3 = -A_1 + e^{-D_1 s} - A_2 e^{-(D_1+D_2)s}, \text{ and}$$

$s = s/\omega_c$, is the Laplace operator, $\omega_c$ is the corner frequency, $a_i$ are polynomial coefficients and $k_2$ is the coefficient for the second derivative component and $D_1$ and $D_2$ are delay factors and $A_1$ and $A_2$ are attenuation factors.

23. Apparatus for conditioning pulse signals representing digital data according to a transfer function of $G_T=[G_2G_3]^2$, said apparatus comprising:
   at least two delay line equalizers for equalizing the pulse signals at each according to a transfer function $G_3$; and
   at least two low pass filters coupled to said delay line equalizer for complementally equalizing said pulse each according to a transfer $G_2$ pulse signals and including means for deriving signals representing the second derivative of, and means for subtracting said second derivative signals from, the filtered pulse signals produced by said low pass filters, where $$G_2 = \frac{1 - k_2 S^2}{S^n + a_{n-1}S^{n-1} + \ldots + a_1 S + 1}, \text{ and}$$

$$G_3 = -A_1 + e^{-D_1 s} - A_2 e^{-(D_1+D_2)s}, \text{ and}$$

$s=s/\omega_c$, s is the Laplace operator, $\omega_c$ is the corner frequency, $a_1$ are polynomial coefficients and $k_2$ is the coefficient for the second derivative component and $D_1$ and $D_2$ are delay factors and $A_1$ and $A_2$ *are attenuation factors.*

* * * * *

UNITED STATES PATENT AND TRADEMARK OFFICE
CERTIFICATE OF CORRECTION

PATENT NO. : 4,875,112

DATED : October 17, 1989

INVENTOR(S) : M. H. Dost et al

It is certified that error appears in the above-identified patent and that said Letters Patent is hereby corrected as shown below:

```
In the title, delete "DIMMING", insert --SLIMMING--
In column 3, line 43, delete "inverse", insert --negative--
In column 5, line 29, delete "13", insert --i₃--
In column 5, line 29, after "through", delete --an--
In column 8, line 66, after "S = S/ω_c", insert --S--

In column 9, line 9, after "signals", delete --at--
In column 10, line 12, after "quency,", insert --a_i--
```

Signed and Sealed this

Fourth Day of February, 1992

Attest:

HARRY F. MANBECK, JR.

Attesting Officer

Commissioner of Patents and Trademarks